United States Patent [19]
Sanford

[11] 3,730,991
[45] May 1, 1973

[54] GROUNDED FACEPLATE KINESCOPE SYSTEM

[75] Inventor: Robert Fincher Sanford, Princeton Junction, N.J.

[73] Assignee: RCA Corporation, New York, N.Y.

[22] Filed: Jan. 22, 1971

[21] Appl. No.: 108,921

[52] U.S. Cl.................178/7.5 R, 315/30, 346/74 CR
[51] Int. Cl........G01d 15/14, H04n 1/22, H01j 29/52
[58] Field of Search.........................178/7.5 R, 7.5 D, 178/6.7 R, 6.6 TP; 346/74 P, 74 CR, 110; 315/30

[56] References Cited

UNITED STATES PATENTS 3,134,046 5/1964 Walton..................................315/30

OTHER PUBLICATIONS

Noll, Television For Radiomen, 1955, pp. 200–202, The Macmillan Company

*Primary Examiner*—Robert L. Griffin
*Assistant Examiner*—John C. Martin
*Attorney*—Eugene M. Whitacre

[57] ABSTRACT

The electron gun of a kinescope is operated at a negative high voltage so as to permit its thin faceplate to be grounded to reduce the possibility of "punch-through" while still maintaining reasonable spot size. Signals to be displayed are direct current coupled to the cathode of the electron gun through a first power supply of substantially the same magnitude as a second power supply providing the high voltage potential to the control grid. The use of a thin faceplate kinescope enables increases in light efficiency for recording on electrophotographic paper while the use of the direct current coupling provides an average brightness level which is substantially independent of the instantaneous value of applied signal amplitude.

6 Claims, 1 Drawing Figure

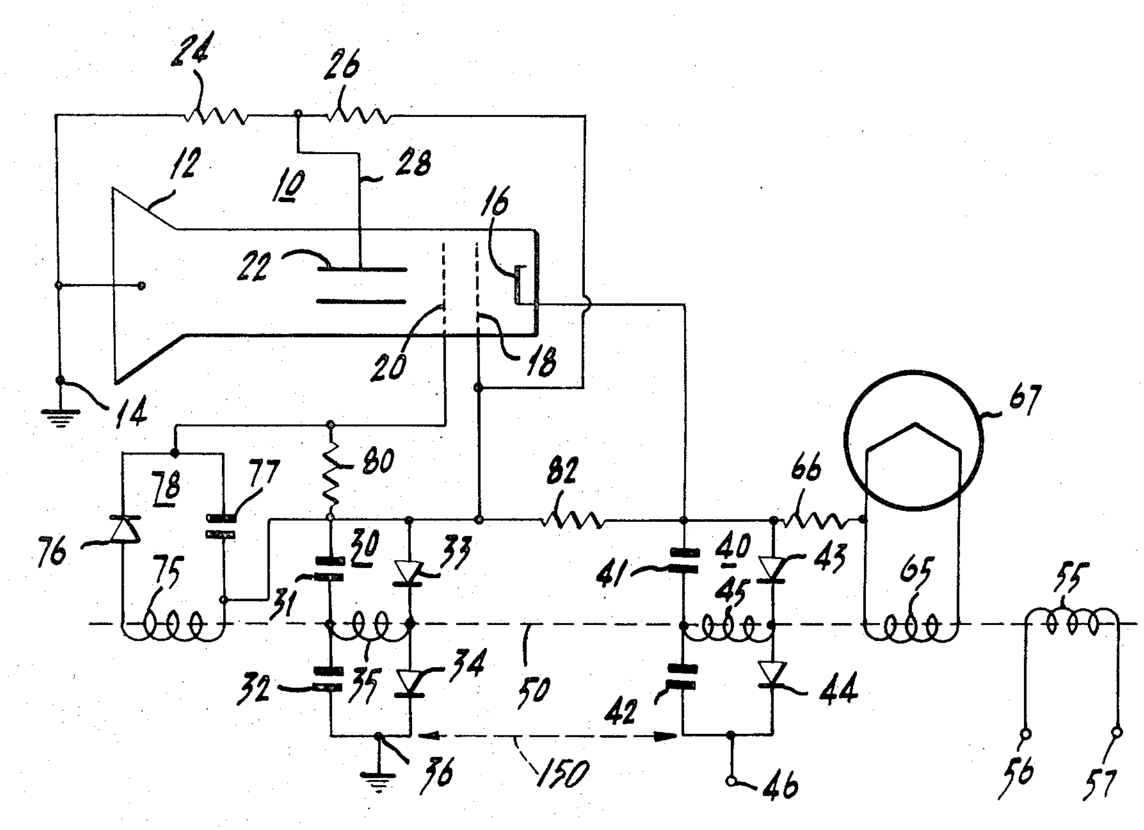
INVENTOR
ROBERT F. SANFORD
BY
Charles Brodsky
ATTORNEY

GROUNDED FACEPLATE KINESCOPE SYSTEM

BACKGROUND OF THE INVENTION

1. Field of the Invention

This invention relates to thin faceplate kinescope display systems and, more particularly, to a circuit arrangement enabling a display to be obtained at an average brightness level which is substantially independent of the instantaneous amplitude of applied information signals, while reducing the possibility of faceplate shatter at such potentials as will produce reasonable spot size.

2. Description of the Prior Art

Such a display system as described above is particularly useful in electrophotographically printing special message informations transmitted to the public using existing television facilities, but without interferring with regular television program service. One embodiment of such a message system as disclosed in U.S. Pat. No. 3,493,674 sequentially multiplexes message representative line scan video signals developed by an auxiliary pick-up camera with primary program video signals developed by a studio pick-up camera during predetermined portions of the vertical blanking interval thereof, at a rate of one line scan signal per message per field of program information. More particularly, such video signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signal. The separated message signals may be recorded using a thin window type cathode-ray tube and an associated Electrofax printer, while the primary program signals are displayed on the kinescope of the home receiver in the conventional way.

As is described in this patent, the thin window tube displays one horizontal line of message information, which is printed on the advancing paper of the Electrofax printer. Since the kinescope of the home receiver is cut off during the vertical blanking interval, the message information included therein is not displayed and thus does not interfere with the regular program picture as seen by the viewer. As is well understood, one advantage of using such a cathode-ray tube at the printer follows from its superior light efficiency characteristics, as compared to that of the receiver kinescope. The faceplate of such thin window tube is generally of the order of 3–5 mils thick so that the mechanical separation between its phosphors and any conductive paper upon which the message information is to be electrophotographically printed is quite small. Similar thinness is also present in the fiber optic type display tube, in the penetration type phosphor display tube and in certain storage tube constructions which require thin membranes for proper functioning. Each of these tubes characteristically exhibits a faceplate which is therefore much thinner than the one-quarter inch of glass utilized in the receiver cathode-ray tube for purposes of mechanical rigidity.

Although having thinner faceplates, it is not unusual to operate these tubes at high potentials comparable to those employed in typical television display kinescopes. Thus, operating these thin faceplate tubes at 20–25 kilovolts produces comparable spot sizes as in usual television designs, but also presents the possibility that "punch-through" or shattering of the thin faceplate could occur if its outer or front side is placed at ground potential—as when the electrically conductive photographic paper is drawn in front of the thin membrane tube to print out such auxiliary message information as envisioned in the above-noted patent. Reducing the operating potential of the thin membrane tube is one solution to this "punch-through" problem, but offers the undesirable feature of lessening spot size and, thus, ultimate resolution. Increasing the thickness of the face plate is similarly disadvantageous as the ensuing reduction in light efficiency which results, also reduces the quality of the output print. While such problems are likely to exist with the thin faceplate tubes noted, such difficulties were avoided in the operation of the message system disclosed in U.S. Pat. No. 3,493,674 because the faceplate was operated at ground potential while the electron gun was operated at the negative high voltage potential necessary. At the same time, coupling of the video information signal to the control grid was effected by a capacitive path which, because of the low duty cycle in printing one line of information for each television field, did not present the possible problem of causing the average brightness of the display to vary as a function of the video content.

SUMMARY OF THE INVENTION

As will be readily apparent, occasions may present itself where the duty cycle of printing is to be greatly increased. Such instance might occur where, instead of transmitting an entertainment or primary program picture for example, all 525 lines of the television frame might be used for the auxiliary message communication purpose to provide a permanent or hard copy print-out. Intermediate printing of greater than one but less than 525 lines is, of course, also possible and, in such greater duty cycle instances, capacitive coupling of the information signal may quite possibly cause average picture brightness to vary as a function of the video content.

As will become clear hereinafter, the present invention comprises a grounded faceplate kinescope system which permits both the use of the high accelerating potential necessary to obtain reasonable spot size together with direct coupling of the applied signal to the kinescope gun so that average picture brightness does not vary as a function of the instantaneous value of applied signal amplitude. In one preferred embodiment of the invention, two low capacity power supplies of comparable magnitude are employed. One supply provides the high negative potential for the control grid of the electron gun, while the second provides a direct potential for the cathode of an amount differing only by the voltage difference necessary in the proper biasing of the tube. In addition, the video or other signal information coupled to the cathode is applied through the second supply such that the average potential difference between control grid and cathode remains substantially constant; only the instantaneous potential difference changes as a function of the video signal amplitude to provide the brightness variations as will produce the permanent print-out. As will be appreciated by those skilled in the art, merely biasing the control grid to the negative kilovolt potential necessary and coupling to the cathode of the electron gun from the output of the video amplifier stage of a television receiver, for example, would be inadequate as the bias on the electron gun would be insufficient to cause any beam variation as is necessary in a display of this tube type. However, by operating the cathode at substantially the same potential as the control grid, those video signal amplitude variations reasonably to be expected will be sufficient to intensity modulate the beam by the required amount, while the high potential difference between the control grid and the grounded faceplate will be sufficient to provide that accelerating potential necessary to produce the spot size needed to obtain adequate resolution.

BRIEF DESCRIPTION OF THE DRAWING

These and other features of the invention will become more readily apparent from a consideration of the following description taken in connection with the accompanying drawing showing one embodiment of a grounded faceplate kinescope system constructed in accordance with the present invention.

DESCRIPTION OF THE PREFERRED EMBODIMENT

In the drawing, the thin faceplate tube to which the present invention is particularly applicable is presented by the reference number 10. The faceplate 12 of the tube 10 is shown connected to a point of ground potential 14 and, for the thin window type of tube for example, includes a cathode electrode 16, a control grid electrode 18 and a screen grid electrode 20. The focusing electrode of the thin window tube 10 is represented by the notation 22 and, as shown, is connected to a point of potential intermediate that which exists between the grounded faceplate 12 and the control grid 18. In particular, resistors 24 and 26 are serially connected between the faceplate 12 and the grid 18, with the focus electrode 22 being connected to the junction of these two resistors by a lead 28.

The two low capacity, comparable power supplies are represented in the drawing by the notations 30, 40. Each constitutes a conventional voltage doubler consisting of a pair of capacitors, a pair of rectifiers and an inductive winding. Thus, the supply 30 includes capacitors 31 and 32 connected in series between the control grid 18 of the thin window tube 10 and a point of ground potential 36, a pair of rectifiers 33, 34 similarly coupled in series between the grid 18 and the potential point 36—with the anode of the rectifier 33 being at the grid 18 and the cathode of the rectifier 34 being at ground 36—and an inductive winding 35 connected between the junction of capacitors 31 and 32 and the junction of rectifiers 33 and 34. In like manner, the power supply 40 includes a pair of capacitors 41, 42 serially coupled between the cathode 16 of the thin window tube 10 and an input signal terminal 46, a pair of rectifiers 43, 44 serially coupled between the cathode 16 and the signal terminal 46—with the anode of the rectifier 43 at the cathode 16 and the cathode of the rectifier 44 at the terminal 46—and an inductive winding 45 connected between the junction of capacitors 41 and 42 and the junction of rectifiers 43 and 44. By selecting the capacitors 31–32 and 41–42, the rectifiers 33–34 and 43–44 and the inductive windings 35, 45 of comparably identical characteristics—and, further, with the windings 35, 45 wound on the same magnetic structure, as indicated by the dotted line 50—the potentials provided by these two supplies 30, 40 can be made to differ approximately by that amount needed to properly bias the tube 10.

By constructing the windings 35, 45 as secondary windings on a transformer having a primary winding driven from a high frequency oscillatory source, the windings 35, 45 can be physically separated from one another on the magnetic structure and from other physical ground planes so as to exhibit the low capacity characteristic desired. Without such low capacity feature, video peaking circuits would be needed to provide such response for the signal applied at terminal 46 as would compensate for this stray capacitance. In the drawing, the inductive element 55 represents the primary winding of such transformer as being on the same magnetic structure 50, and will be understood as being coupled to a high frequency source at its terminals 56, 57—for example, the nominal 15.75 KHz oscillator employed in the horizontal sweep section of the television receiver.

Also shown in the drawing are two additional inductive elements 65, 75. The first element 65 represents an additional secondary winding on the magnetic structure 50 to provide the filament voltage necessary for the thin window cathode-ray operation. A resistor 66 is included between the filament 67 and the cathode electrode of the tube 16 so as to reference the filament 67 with respect to ground and to establish that voltage difference between the cathode 16 and filament 67 as is in accordance with the electron gun specifications of the particular tube employed. The other inductive element 75, on the other hand, represents a further secondary winding on the magnetic structure 50, forming part of a third power supply 78 providing the screen grid voltage for the thin window tube 10. As shown, the winding 75 is connected between the anode of an included rectifier 76 and one plate of a capacitor 77, the other plate of which is connected to the cathode of the rectifier 76 and with the junction there formed being directly connected to the screen grid 20.

Lastly, the arrangement of the drawing includes an added resistor 80 coupled between the screen grid 20 and the control grid 18 and an additional resistor 82 connected between the cathode 16 and control grid 18. Both these resistors 80, 82 are utilized as protective devices to discharge those voltages stored on the capacitive elements of the various power supplies when the energy to the thin faceplate tube 10 is turned off, such as when the television receiver providing the oscillatory signal at terminals 56, 57 is shut down.

With a supplied oscillatory signal at terminals 56, 57 of some 15.75 KHz frequency and 50 volt peak-to-peak amplitude, one selection of inductive winding turns, coupling coefficients and capacitor characteristics has been selected to provide a potential at the control grid 18 of the kinescope 10 of a value of 20 kilovolts negative with respect to ground. Similar design characteristic selection has been made to provide a negative potential for the cathode 16 with respect to ground of approximately 19.95 kilovolts and to provide 19.8 kilovolts negative for the screen grid 20. Thus, the screen grid 20 is biased to a positive potential with respect to the potential to which the cathode 16 is biased—in accordance with desired electron gun design—while the control grid 18 is similarly biased to its proper negative potential with respect to the cathode. At the same time, the faceplate 12 of the tube 10 is biased positive with respect to the control grid 18 by an amount comparable to that existent in typical television receiver arrangements for broadcast reproduction. However, by referencing the cathode 16 of the thin faceplate tube 10 not to ground 36 (as with the power supply 30) but to a point 46 at which negative-going video signals are supplied (as with the supply 40), the cathode potential is effectively modulated with video information and the instantaneous voltage difference between the cathode 16 and the control grid 18 is similarly so modulated. At the same time, though, the two comparable power supply constructions serve to maintain the average potential difference between these two electrodes substantially constant. The overall effect is than analagous to a direct current coupling of the video signal to the cathode 16 so that while the instantaneous brightness of the light emitted by the energized kinescope phosphors will change, the average brightness will remain constant due to the fixed values of the supplies 30, 40.

Such an arrangement as thus described has been found to be superior to other available power supply configurations—such as the H.V. Coupling Amplifier, Model 1067, offerred by the Electron Tub Division of Litton Industries—in proper biasing of thin faceplate kinescopes, and in its significantly reduced cost. It has also been found superior in its usefulness to the alternating current coupling configuration noted as being employed in the arrangement of U.S. Pat. No. 3,493,674, where only one supply of the type 30, 40 herein was employed to develop the negative kilovolt potential needed for the grounded faceplate system. There, the kilovolt supply was used to develop the negative control grid potential, and a pair of supplies of the type shown by the notation 78 in this specification were employed, referenced to the kilovolt potential, to develop the 50 volt or so more positive voltage for the cathode and the 200 volt or so more positive voltage for the screen grid. The capacitive coupling of applied signals to the control grid as successfully employed in such low duty cycle arrangement so as not to upset the developed bias potentials will thus be seen to be somewhat less than optimum in the high duty cycle environments envisioned by the present invention as such arrangements will tend to develop an additional, average bias potential dependent upon the instantaneous signal content.

While there has been described what is considered to be a preferred embodiment of the invention, it will be readily apparent to those skilled in the art that modifications to the specific construction may be made without departing from the teachings disclosed herein. Thus, while the input information signals to be reproduced have been described as being direct current coupled through the supply 40 to the cathode electrode 16, it will be obvious that similar coupling could be made instead through the supply 30 to the control grid 18, merely by interchanging the illustrated terminals 36, 46 as indicated by the dotted line 150. Such rearrangement of terminals as would be necessary to effect such modification is submitted to be obvious to those versed in this technology. Similarly, while the invention has been specifically described in conjunction with a thin window tube type of kinescope, the disclosure of this specification is equally applicable in other display systems where it is desirable to operate the faceplate of the display device at ground potential. It is therefore contemplated that the appended claims be read in the true spirit and scope of this invention.

What is claimed is:

1. In conjunction with an image reproducing device of the type having control grid, screen grid and cathode electrodes and a faceplate biased to a positive potential with respect to said electrodes by an amount which determines the illuminated spot size in the image display provided by said device, the combination comprising:

means electrically coupling the faceplate of said image reproducing device to a point of predetermined potential;

first power supply means having a first terminal coupled to said control grid for biasing said control grid to a potential which is negative with respect to the potential coupled to said faceplate and of a magnitude to provide said spot size display;

second power supply means having a first terminal coupled to said screen grid for biasing said screen grid to a potential which is positive with respect to the potential to which said control grid is biased;

third power supply means having a first terminal coupled to said cathode for biasing said cathode to a potential different from that to which said control grid is biased and which is negative with respect to the potential to which said screen grid is biased;

input signal supply means coupled to a second terminal of one of said first and third power supply means to direct current couple information signals by way of said first or third supply means to one of said control grid and cathode electrodes for reproduction by said image device;

and means coupling said second terminal of said other of said first and third power supply means to a point of reference potential;

with said first, second and third power supply means each including an inductive secondary winding on a common magnetic structure and with a single inductive winding included to serve as a primary winding on said structure in developing the bias potentials for said control grid, screen grid and cathode electrodes in response to an applied energizing voltage;

said coupling of information signals and potential referencing being such that the average brightness of said image display becomes dependent upon the relatively fixed control grid to cathode potential established by said first and third power supply means while the instantaneous brightness of said display becomes dependent upon the instantaneous amplitude of said supplied information signals.

2. The combination of claim 1 wherein said first power supply means has a second terminal connected to the point at which said predetermined potential exists, wherein said second power supply means has a second terminal also referenced to said point of predetermined potential, wherein said third power supply means has its first terminal coupled to the cathode of said image reproducing device for biasing said cathode to a potential which is positive with respect to the potential to which said control grid is biased, and wherein said input signal supply means is coupled to said second terminal of said third power supply means to direct current couple negative-going information signals to said cathode electrode for reproduction by said image reproducing device.

3. The combination of claim 1 wherein said first and third power supply means provide comparable potentials to said control grid and cathode electrodes respectively, differing by approximately that amount necessary to bias said image reproducing device in accordance with the amplitude of information signals supplied for reproduction.

4. The combination of claim 3 wherein said second power supply means has its second terminal referenced to said first terminal of said first power supply means so as to provide a potential to said screen grid differing from that provided by said first power supply means to said control grid by an amount substantially equal to the potential difference required by said image reproducing device in order to provide the particular spot size desired.

5. The combination of claim 4 wherein said electrical coupling means couples the faceplate of said image reproducing device to a point of ground potential.

6. The combination of claim 5 wherein said first power supply means biases said control grid to a kilovolt potential which is negative with respect to ground and wherein said second and third power supply means respectively bias said screen grid and cathode to negative potentials differing from that at said control grid by amounts of the order of 50–200 volts.

* * * * *